Jan. 26, 1932.  E. B. STONE  1,843,072
SPARE WHEEL OR RIM LOCK
Filed May 4, 1928
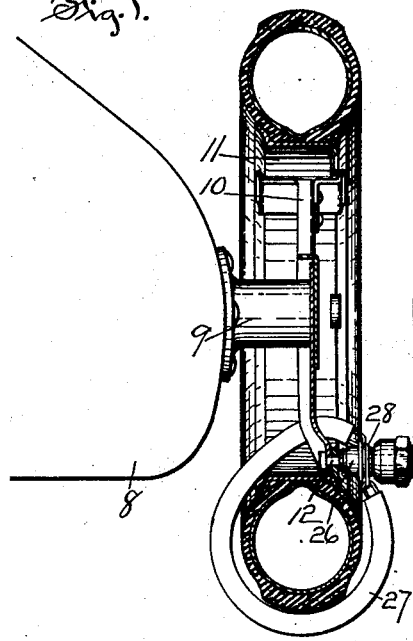
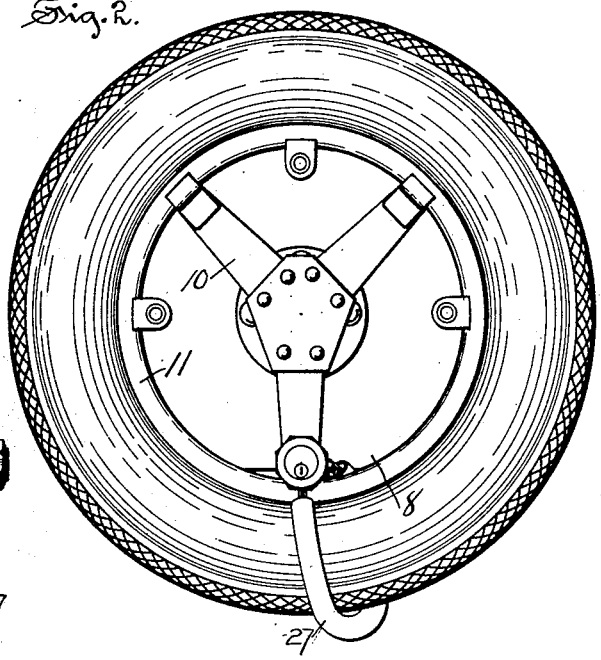
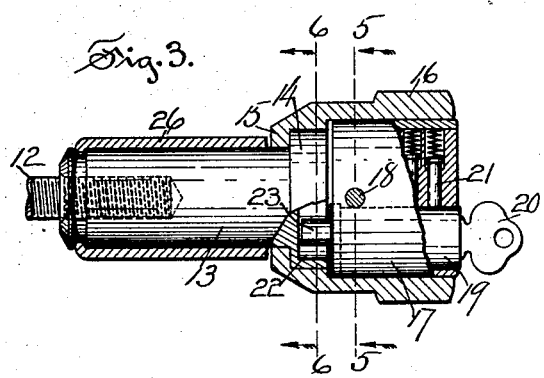
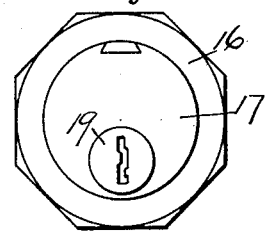
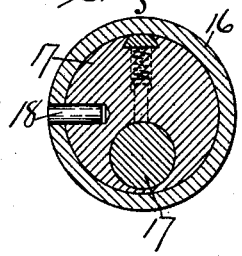
INVENTOR
Elmer B. Stone
by
Arthur ~~~~~~
ATTORNEY Patented Jan. 26, 1932

1,843,072

UNITED STATES PATENT OFFICE

ELMER B. STONE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT

SPARE WHEEL OR RIM LOCK

Application filed May 4, 1928. Serial No. 275,022.

My invention relates to the class of devices more particularly designed to prevent unauthorized removal of a wheel or wheel rim from a support commonly provided on vehicles for carrying such wheel or rim, and an object of my invention, among others, is the production of a lock to be used for this purpose, which lock shall be simple in construction and particularly efficient for the purpose for which it is designed.

One form of a device embodying my invention, and in the construction and use of which the objects herein set out, as well as others, may be attained, is illustrated in the accompanying drawings, in which—

Figure 1 is a view in central cross section through a vehicle wheel rim and tire shown as attached to the wheel or rim support of a vehicle and illustrating the application of my improved lock, in securing both the rim and tire.

Figure 2 is a front view of the same.

Figure 3 is a detail view, partially in lengthwise section, through my improved lock and with parts otherwise cut away to show construction.

Figure 4 is an end view of the same.

Figure 5 is a view in cross section on a plane denoted by the dotted line 5—5 of Figure 3.

Figure 6 is a similar view on a plane denoted by the dotted line 6—6 of Figure 3.

Figure 7 is another similar view but showing the position of the locking bolt to lock the two sections of the device together, the bolt being turned into locked position.

In the accompanying drawings the numeral 8 indicates the back portion of a motor vehicle and 9 an arm secured thereto and projecting therefrom and comprising a support for a spare wheel or rim, the outer end of this arm being suitably formed to receive the spare wheel or rim, which means, in the structure herein shown, is particularly arranged to receive a wheel rim and which is in the form of a spider secured to the arm 9 and having radiating arms 10 formed on their outer ends to receive the rim 11 of a wheel. The means for securing the rim in place embodies a stud 12 or other suitable fastening member, which stud when employed, is threaded to receive a nut for securing the rim or wheel in place, this stud, when acting to hold a rim, as herein shown, projecting through one of the ears employed to secure the rim to the felly of a wheel.

My improved device constitutes a retainer that is formed in two parts, a body or holder 13 and an actuator located at the end of the body and adapted to be secured thereto or released therefrom. In the structure herein shown the body has a head 14 that is shouldered to receive a flange 15 on the inner end of a shell 16 comprising a part of said actuator. Another portion of said actuator comprises a case 17 of a lock that is secured to the shell 16 as by means of a pin 18. A plug 19 is located within the case 17, this plug and case being of ordinary construction common to pin tumbler locks, the plug having a slot to receive a key 20 and said plug also having tumblers positioned by said key and cooperating with tumblers 21 in the lock case to lock the plug against rotation or to release it for rotation in a manner readily understood by those skilled in the art.

The head 14 has a number of locking recesses 22 preferably of semi-circular form in cross section, and as shown in Figures 6 and 7 of the drawings. The plug 19 has a locking bolt 23 eccentrically located and projecting from the end of the plug, and as shown in Figure 3. This locking bolt is of semi-circular form except that the side opposite the circular side is also slightly rounded to conform to the circular portions 24 of an enlarged recess 25 in the end of the head 14 and from which enlarged recess the recesses 22 open, that is, the recesses 22 are formed in the wall of the recess 25, and as shown in Figure 6 of the drawings.

The bolt 23 is so located and formed that when turned into one position, and as shown in Figure 6 the case 17 and shell 16 may be rotated independently of the body 13, but when the bolt is turned into another position, and as shown in Figure 7, said parts are locked against independent rotation. When thus locked the shell 16 may be employed to rotate the body 13 thereby screwing it onto the stud 12 to secure the rim in place. The plug 19 being operated to place the bolt in its unlocking position the shell 16 cannot be made use of to loosen the body 13. The head of the shell 16 is formed to receive a wrench for the purpose of turning the parts.

It will be noted that there are a number of recesses 22 so that when it is desired to lock the actuator to the body 13 the actuator need be turned only to a slight extent. The body or holder 13 is insertable into the recess in the shell and through the opening bounded by the flange 15, and when so inserted the case 17 after being secured to the shell movably retains the body or holder in place.

In order to prevent rotation of the body 13 as by means of a wrench applied thereto, a sleeve 26 is loosely fitted onto the body 13 so that it will readily rotate thereon, and this effectually prevents any chance for turning the body by means of a wrench or other tool applied to said body.

It will be observed that this lock is peculiarly adapted, not only to secure the rim of a wheel in place on the bracket but also to secure the tire so that it may not be deflated and removed. In accomplishing this purpose the ends of a chain 27 may be provided with rings 28 that will fit over the sleeve 26. These rings and the sleeve may be both composed of hard tough metal that will prevent ordinary attempts at cutting, and the tire will thus be secured against unauthorized removal.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A lock comprising a holder adapted to engage a threaded member and having an enlarged circular recess with a locking recess in its side wall, and a lock attached to said holder for movement independently thereof and including a rotatable member with a bolt eccentrically positioned thereon and shaped on one side to fit in said enlarged recess to form a bearing in its unlocked position and rotatable into said locking recess for locking purpose.

2. A lock comprising a shell having a recess partially closed by a flange at one end, a holder having a head located in said recess and held by said flange and having a recess in its end opening into the recess in the shell, said holder projecting out of said shell recess, means for engaging said holder with a fastening member, and key operated means secured within the recess in said shell and including a bolt extending out of said recess to engage in the recess in the end of said head.

3. A lock comprising a shell having a recess partially closed by a flange at one end, a holder insertable through said recess to project beyond the end of the shell, said holder having a head located in said recess and held by said flange, said head having an end recess with a notch in the side of the recess, means for engaging said holder with a fastening member, and key operated means secured within the recess of said shell to retain said holder from removal, said key operated means including a bolt extending from one end thereof to engage the notch in said head recess.

4. A lock comprising a body having a head with an enlarged circular recess and locking recesses in the side wall of said enlarged recess, a locking member rotatably mounted on said body and including a key operated rotatable member, and a locking bolt eccentrically mounted on said key operated rotatable member and projecting therefrom and adapted to be positioned thereby for revolution in said enlarged recess or to be so positioned within a locking recess to secure said body to said locking member, said bolt being shaped on one side to fit the wall of said circular recess for bearing thereon.

ELMER B. STONE.